United States Patent

Johnssen

[11] Patent Number: 5,707,762
[45] Date of Patent: Jan. 13, 1998

[54] MODULAR POWER PLANT FOR THE GENERATION OF ELECTRICAL ENERGY FROM SOLAR ENERGY

[75] Inventor: Wolf Johnssen, München, Germany

[73] Assignee: Hannelore Binsmaier Nee Gallin-Ast, Erdweg-Grossberghofen, Germany

[21] Appl. No.: 602,762
[22] PCT Filed: Aug. 6, 1994
[86] PCT No.: PCT/EP94/02614
  § 371 Date: Feb. 23, 1996
  § 102(e) Date: Feb. 23, 1996
[87] PCT Pub. No.: WO95/06334
  PCT Pub. Date: Mar. 2, 1995

[30] Foreign Application Priority Data

Aug. 24, 1993 [DE] Germany ............ 43 28 379.9

[51] Int. Cl.[6] ........................... H01M 8/06
[52] U.S. Cl. ........................... 429/2; 429/17
[58] Field of Search ................ 429/2, 17, 19

[56] References Cited

U.S. PATENT DOCUMENTS 4,117,202  9/1978  Beck ........................... 429/2
4,988,580  1/1991  Ohsaki et al. .

FOREIGN PATENT DOCUMENTS 0 345 908 A1  12/1989  European Pat. Off. .
0 564 796 A1  10/1992  European Pat. Off. .
  1 340 155   9/1993  France .
  4274172    9/1992  Japan .

OTHER PUBLICATIONS

Fuel Cell Energy Recovery From Landfill Gas by Sandelli et al., Journal of Power Sources 37 (1991) 255–254 Chemical Abstracts, vol. 90 1979 p. 174 (month N/A).
Energy Biomass Wastes No. 9 (1985) Technical and Economic Assessment of Biomass-Based Fuel Cell Power Systems, by E.I. Wan. Sicily's Electric Power Production ... by V. Alderucci et al. Applied Energy vol. 45 No. 3, 1993 (month N/A).

*Primary Examiner*—M. Nuzzolillo
*Attorney, Agent, or Firm*—Herbert Dubno

[57] ABSTRACT

A modular plant for the generation of electrical energy from solar energy. The principle structure consists of a conversion module (1) for the conversion of solar energy into biological raw material, a gasification module (2) in the form reactor for the gasification of biological raw material, and a fuel cell module (3) for the conversion of gas into electricity using fuel cell technology. The conversion module (1) contains an aggregate (4) for harvesting biological raw material and a processing aggregate (5) for processing biological raw material into a gasification product. The gasification module (2) is connected to the processing aggregate (5) via a supply unit (6). The fuel cell module is connected to the gasification module for cleaning of the fuel gas by a device (8). The performance of the gasification and fuel cell module has been designed in relation to the system performance, so that part of the fuel gas can be used for the water vapour production (12) and a further part and/or the waste heat of the modular power plant for the drying of harvested biological raw material.

6 Claims, 2 Drawing Sheets

MODULAR POWER PLANT FOR THE GENERATION OF ELECTRICAL ENERGY FROM SOLAR ENERGY

CROSS-REFERENCE TO RELATED APPLICATIONS

This application is a national phase of PCT/EP 94/02614 filed 6 Aug. 1994 and based, in turn, upon German National application P 43 283 79.9 of 24 Aug. 1993 under the International Convention.

FIELD OF THE INVENTION

The invention relates to a Modular Power Plant for the generation of electrical energy from solar energy. A modular Power Plant is a power plant that consists of several modules with different functions, and from which the Power Plant as a whole is constructed. The modules are made in serial production. The modules are connected by functional and control lines.

BACKGROUND OF THE INVENTION

A Modular Power Plant for the production mainly of hydrogen from solar energy is unknown. However, Solar Power Plants consisting of several similar modules, so called sun collectors, for the absorption of solar energy are known, in which a thermal effect aided by thermal heat engines or a photoelectric effect, converts solar into electrical energy. Furthermore Power Plants containing at least one gasification reactor for the gasification of fossil fuel and biological raw material into fuel gas are known, in which the fuel gas is converted into electricity by a thermal heat engine.

Biological raw material generally refers to all regenerative raw material, i.e. such raw material which can be biologically. restored depending on the vegetation cycle of a region. Biological raw material differs therefore from fossil fuel which takes considerably longer to form than to be used. Biological material can principally be provided with intact cell structures or disintegrated structures i.e. as fine powder. The main elements contained in biological raw material are carbon, hydrogen, oxygen and nitrogen with little protein and sulphur. With regards to the invention, biological raw material refers to fast growing plants, especially perennial plants and plants high in lignin. Biological raw material in this context refers to preferably $C_4$-plants, $C_4$-reeds and $C_4$-grass. The protein and sulphur contents can be influenced by fertilization.

Furthermore the direct generation of electricity from hydrogen using fuel cells is well known and especially suited for a relatively low performance in the region of 1 to 5 MW. Compared to thermal heat engines, fuel cells have the advantage of not being subject to the thermodynamic efficiency limitations of the Carnot cycle. Theoretically, fuel cells can achieve a near perfect conversion of combustion heat into electrical energy from by the reaction of hydrogen and oxygen to form water. In operation fuel cells can therefore easily attain considerably higher efficiencies than thermal heat engines. This, however, assumes that the catalysts are not poisoned by catalytic poison potentially contained in hydrogen.

Molecular hydrogen is not naturally as raw material for the generation of electrical energy, but must be produced from hydrogen containing raw material. The generation of hydrogen from water using normal electrolysis uses more electricity than is generated by the hydrogen and is therefore not a feasible option. The catalytic water fission in hydrogen and oxygen is extremely slow and yields despite high expenditure only low quantities making it commercially unattractive.

The generation of so called synthesis gas from coal, principally containing hydrogen and carbon monoxide and the systems required for this process, have been known for some time, the process being called coal gasification. In a so called water shift reaction, the carbon monoxide of the synthesis gas can be converted into hydrogen and carbon dioxide by adding water vapor and applying heat.

In principle synthesis gas can be used for fuel cells although in operation this has been shown to have considerable disadvantages. Firstly coal normally contains sulphur which is dragged along as gaseous sulphur compounds in synthesis gas. Sulphur compounds, however, are normally strong catalytic poisons which can irreversibly deactivate the catalyst of a fuel cell and consequently the fuel cell itself. From an environmental aspect sulphur containing gases are also an Undesired emission. Secondly the overall generation of synthesis gas from coal is extremely expensive and difficult as costs from underground mining, coal gasification and required desulphurization accumulate.

Up to now electrical energy has been produced centrally in large Power Plants although the power usage of individual local users is comparatively small.

SUMMARY OF THE INVENTION

The underlying technical problem of the invention is the easy local conversion of solar energy into electrical energy. The technical problem is solved by the invention of a Modular Power Plant for the generation of electrical energy from solar energy, which comprises a) a conversion module for the conversion of solar energy into biological raw material sufficiently free from sulphur in the form of an agricultural area cultivated with plants, especially $C_4$-plants.

b) a gasification module in the form of a gasification reactor which gasifies biological raw material into a fuel gas using water vapor and elevated temperatures, and in which the gasified products remain in the gasification zone of the gasification reactor for a certain period, to suppress tar condensation in zones after the gasification zone of the gasification module and/or in a subsequent fuel cell module.

c) a fuel cell module in which the fuel gas is converted into electrical energy using fuel cell technology.

The conversion module is a unit for harvesting biological raw material and a processing unit for the processing of biological raw material into a gasification preproduct, the gasification module being connected to the processing unit by means of a supply unit. The fuel cell module is connected to the gasification module for the cleaning of the fuel gas. The performance of the gasification and fuel cell module match each other in relation to the system performance and in such a way that part of the fuel gas can be utilized for water vapor generation and a further part and/or waste heat of the Modular Power Plant can be utilized for the drying of harvested biological raw material. The size of the conversion module depends on the stipulated system performance in relation to the cultivated area. The conversion module has at least one harvester for biological raw material and a chaff cutter or pelletizer. Within the context of the invention the harvested biological raw material is bundled and/or bailed and stored to process the biological raw material into the gasification preproduct when required. Alternatively storage could be provided for the processed biological substance to balance quantity variations of processed biological raw material caused by vegetation cycles. It is understood that as part of the invention several Modular Power Plants of the described structure can be installed next to one another, the conversion module also allowing the operation of several Modular Power Plants. The generated electrical energy can be used locally or fed into a grid. The principal elements of-the conversion, gasification and fuel cell module are preferably prefabricated as modular elements of a Modular Power Plant, being transportable in an assembled and disassembled condition.

The invention is based on the fact that solar energy can be absorbed and stored in considerable amounts with little technical effort within vegetation cycles of geographical zones using natural sun collectors, i.e. plants which are convertible into biological raw material. Solar energy stored in this way can be converted easily into electricity if the conversion into electricity takes place at the storage site, the combination of charscteristics b) and c) is realized and modules for a Power Plant of relative low performance i.e. 1 to 5 MW are installed at the storage place. For this the individual modules are produced centrally and transported to the storage place or split into further components for transportation. At the installation site the aforementioned performance matching of the conversion module to the performance supplied and stipulated for the gasification and fuel cell module takes place. In this respect the invention combines a natural conversion process for solar energy with hardware elements and the so formed conversion module with proven aggregates for the generation of fuel gas and conversion into electricity which are themselves formed as modules.

The invention offers various extension and design options. A preferred form of the invention is characterised in that the gasification module is set to allothermal gasification—and preferably operated with the fuel gas having a water vapor/biological substance proportion of larger than 1. The gasification-module contains a gasification reactor being pressurised and operated with water vapor as gasification and fluidising agent, as is usual for fossil fuels (see EP 0 329 673 B1).

The invention also offers several options with regards to the fuel cell module. The fuel cell module can for instance consist of at least one fuel cell with a phosphoric acid electrolyte. According to another option, the fuel cell module contains at least one fuel cell with a carbonate melt electrolyte. According to a further option, the fuel cell module contains at least one solid oxide fuel cell. An especially important suggestion of the invention is the provision of at least one proton exchange membrane in the fuel cell module. A preferred form of the invention distinguished by guaranteed operation and long life of the modules, especially the fuel cell module, is characterized by the combination of a gasification module set up for allothermal gasification with a fuel cell module containing at least one fuel cell with a phosphoric acid electrolyte. Alternatively fuel cells can be combined in a fuel cell module. In all cases, however, module life is enhanced, if the gasification module is adjusted to a oxygen/biological raw material proportion and a gas phase temperature, ensuring a near nitrogen oxide free fuel gas. Surprisingly a gasification module set up in this way does not produce harmful tar condensation, especially when the gasification itself is allothermal.

A modular power plant according to the invention can operate self-sufficiently with little effort. For this the invention stipulates an additional water vapor generating module being heated by part of the fuel gas. The conversion module can also be equipped with a drying unit heated by the waste heat of the Modular Power Plant. In a Modular Power Plant according to the invention, ash is produced by the gasification, which can be used as fertilizer for the conversion module. Plants and especially the perennial $C_4$-plants which are convertible into biological raw material, die only after five, ten or more vegetation cycles. Only then must the conversion module be recultivated agriculturally.

Below some of the fuel cells suitable for the fuel cell module of a Modular Power Plant of the invention and their integration into a gasification module are explained in more detail.

According to one option of the invention the following procedure is adopted:

Biological raw material is utilized which due to for instance suitable fertilization is sufficiently free from raw material sulphur. In an oxidation reactor a fuel gas containing carbon monoxide and hydrogen is generated from the biological raw material using an oxygen-containing gasification agent and partial oxidation. A proportion of oxygen to biological material and a gas phase temperature is set and maintained in the oxidation reactor guaranteeing a fuel gas product nearly completely free from nitrogen oxide. A separator removes suspended particles from the fuel gas drawn from the oxidation reactor. The thus cleaned fuel gas is then converted into electric energy in fuel cells containing a porous anode, a porous cathode and a carbonate melt electrolyte. Anode refers to the possibly catalytically active electrode of the fuel cell along which the fuel gas passes and where it is oxidized giving off electrons. Cathode refers to the possible catalytically active electrode passed by a combustion agent being reduced by the uptake of electrons. For the conversion with oxygen to the carbonization at the cathode the combustion agent must contain carbon monoxide. Porous refers to an electrode structure which on one hand guarantees a contact of all three phases, fuel gas or combustion agent, electrode or catalyst and electrolyte, and which on the other hand, however, prevents the flooding of the electrolyte into the fuel gas chamber or combustion agent gas chamber through capillary forces. The term porous relates therefor also to a mesh structure with a suitable mesh size. Fuel cells containing a carbonate melt electrolyte show a superior efficiency and high specific performance due to the comparatively high operating temperature. A further advantage of this type of fuel cell in connection with the generation of electricity from fuel gas formed from biological raw material is, that carbon monoxide, apart from not interfering with the catalysis can also like hydrogen, be used for the generation of electrical energy with carbon monoxide and carbonate ions reacting at the anode and a donation of electrons to carbon dioxide. On the whole, the combination results in a considerable synergy of electrical energy being generated with an especially high efficiency and reliability from a cheap and regenerative raw material with nearly no hydrogen sulfide, nitrogen oxide or particle emission. End products of this method are mainly harmless water and for the conventional energy generation unavoidable carbon dioxide. Furthermore heat is generated which especially in the use of the allothermal method can be recirculated into the process.

With regards to another option of the invention the following method is employed: Biological raw material is used which for instance due to suitable fertilization is sufficiently free from sulphur. In an oxidation reactor a fuel gas containing carbon monoxide and hydrogen is generated from biological raw material and an oxygen containing gasification agent using partial oxidation. In the oxidation reactor the proportion of oxygen to biological raw material and the gas phase temperature is set and maintained, guaranteeing a near nitrogen oxide free fuel gas. A separator removes suspended particles from the fuel gas withdrawn from an oxidation reactor. The thus cleaned fuel gas is converted into electricity in fuel cells containing a porous anode, a porous cathode and an acidic electrolyte. This option contains in principle all of the characteristics and advantages of the carbonate melt electrolyte option. The fuel cell is, however, have operated at a comparatively low temperature. Overall the efficiency of an acidic electrolyte is lower than that of an carbonate melt electrolyte. This is, however, compensated by the fact that due to the comparatively low temperature, electrode corrosion can be controlled easier, achieving extra reliability as for instance, melting of the supporting frame of the electrode pore structure can definitely be avoided. Sulphuric acid or phosphoric acid are preferred electrolytes. Both acids and especially phosphoric acid have a relative high boiling point with little added water, so that fuel cells can be operated at high temperatures, i.e. 160° C.

According to the method used by the invention different options of partial oxidation in the oxidation reactor can be operated. Especially a direct partial combustion of biological raw material can be carried out in the oxidation reactor. In one option, being Of special significance, partial oxidation is carried out with externally produced heat and a gasification agent containing mainly water vapor. In a different context this procedure is known as allothermal gasification. Allothermal gasification requires a supply of externally generated heat as the conversion of biologically raw material with water vapor into fuel gas is altogether endothermic. The heat required for the partial oxidation can preferably be produced by combustion of biologically raw material or fuel gas. Preferably the heat for the part oxidation is being carried into the oxidation reactor by means of a usual heat transfer gas via a heat exchanger. In another option of the invention, part oxidation is carried out without the supply of externally generated heat and with a gasification agent mainly containing water vapor and molecular oxygen or air. In another context this procedure is known as autothermal gasification. In this exothermal oxidation reactions are created by the molecular oxygen in the gasification agent creating "insitu" heat for the endothermal reaction of water vapor and biological raw material. Autothermal or allothermal gasification is principally known from the publication "Stahl und Eisen", issue 110, 1990 nr. 8, pages 131 to 136 although, however, in a different context.

Another procedure within the concept of the invention for the generation of electrical energy from biological raw material features the following characteristics:

Biological raw material is used which due to suitable fertilization is sufficiently free from sulphur. In an oxidation reactor a carbon oxide and hydrogen containing fuel gas is generated from biological raw material with an oxygen-containing gasification agent, using partial oxidation. In the oxidation reactor a proportion of oxygen to biological raw material and a gas phase temperature, guaranteeing a near nitrogen oxide free fuel gas is set up and maintained. A separator removes suspended particles from the fuel gas withdrawn from the oxidation reactor. The thus cleaned fuel gas is then converted into electrical energy in a fuel cell containing a porous anode, a porous cathode and a solid metal oxide electrolyte, the fuel cell being operated at a minimum 800° C., again using autothermal or allothermal fuel generation.

Because of the extreme operating temperature of fuel cells with solid metal oxide electrolyte, the catalytic effect of the electrodes is unnecessary and a high reaction rate of the fuel gas on the anode and of the combustion agent on the cathode appears as the thermal energy of the gases lies considerably above the activation energy of the heterogenous dissociation reaction. High reaction rates in turn facilitate a high specific electrical performance of fuel cells. Consequently preferred forms of fuel cells are operated at a minimum of 1000° C. and preferably at a minimum of 1200° C. Such high operating temperatures can easily be set up if anode, cathode and electrolyte materials are coordinated or adapted with regards to their thermal expansion factors. It is understood that anode and cathode materials are also sufficiently corrosion resistant. The solid electrolyte can be set to a high ion conductivity if the electrolyte consists of a mixture of zirconium and calcium oxide or zirconium and yttrium oxide. A high ion conductivity combined with a high electrode reaction rate guarantees a high specific performance of the fuel cells. In a further form a ceramic metal preferably consisting of zirconium oxides and nickel or cobalt is preferably used as anode and $LaNiO_3$ or doped indium oxide as cathode material.

To reduce possibly interfering carbon monoxide in fuel gas, the gas can be treated in a water shift reactor adding water vapor at elevated temperatures to convert carbon monoxide to hydrogen and carbon dioxide. A possible interfering hydrocarbon content of the fuel gas can be reduced by passing the fuel gas directly before conversion to electrical energy through a reformer with a catalyst, preferably with a transition metal catalyst and ideally with a nickel catalyst, the catalyst being operated at the same temperature level as the fuel cells.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
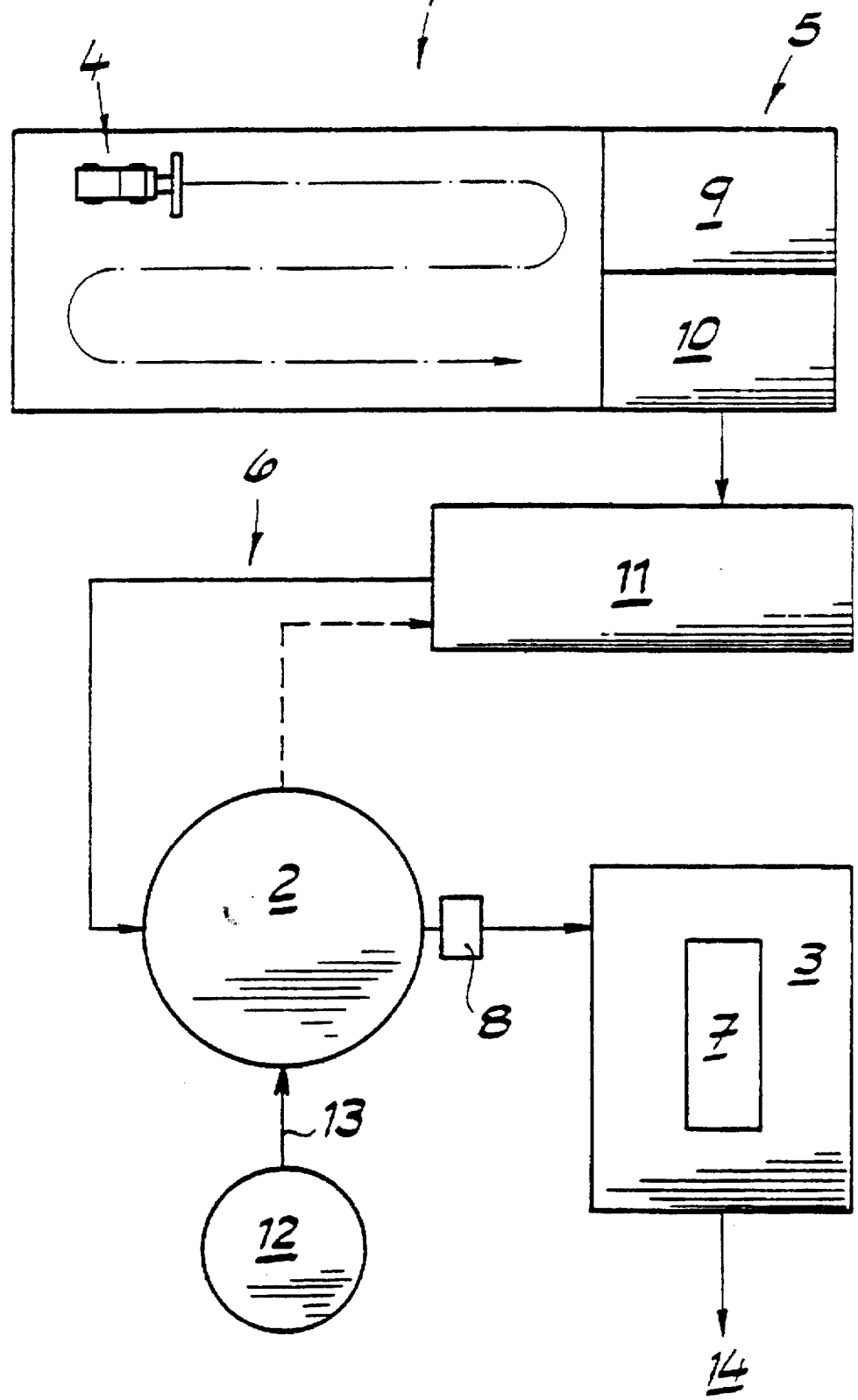
FIG. 1 is a diagram of the Modular Power Plant of the invention.

The Modular Power Plant shown in the drawing generates electrical energy from solar energy. The modular power plant consists of three special function modules:

A conversion-module 1 for the conversion of solar energy into biological raw material sufficiently free from sulphur, and in the form of an agricultural area (plot) cultivated with plants, especially perennial $C_4$-plants, convertible into biological raw material. A gasification module 2 in form of a gasification reactor for the gasification of biological raw material into a fuel gas, using water vapor under heat and with the gasifiable products being contained in the gasification zone of the gasification reactor for a certain period, suppressing tar condensation in the zones following the gasification zone of the gasification module and/or in the follow-on fuel cell module. A fuel cell module 3 in which the fuel gas is converted into electrical energy.

The conversion module 1 containing unit 4 for harvesting the biological raw material and a processing unit 5 for the processing of biological raw material into a gasification preproduct. The processing aggregate can be stationary or mobile.

The gasification module 2 is connected to the processing aggregate 5 via a supply device 6.

The fuel cell module 3 containing a fuel cell 7 is connected to the gasification module 2 by a device 8 for fuel gas cleaning. As par of the design the performance of the gasification module 2 and the fuel cell module 3 are matched in relation to the system performance, and are set in such a way that partial of the fuel gas can be utilized for water vapor generation and a further part and/or the waste heat of the Modular Power Plant can be used for the drying of harvested biological raw material.

The conversion module 1 contains a processing aggregate 5 for biological raw material in form of a chaff cutter 9 or pelletizer 10. The conversion module 1 also contains a storage facility 11 for the processed biological substance, compensating for quantity variations of processed biological raw material due to vegetation cycles.

The principal elements of the conversion module 1, gasification module 2 and fuel cell module 3 can be transported assembled or disassembled and are normally prefabricated at a central location.

Figure 2:
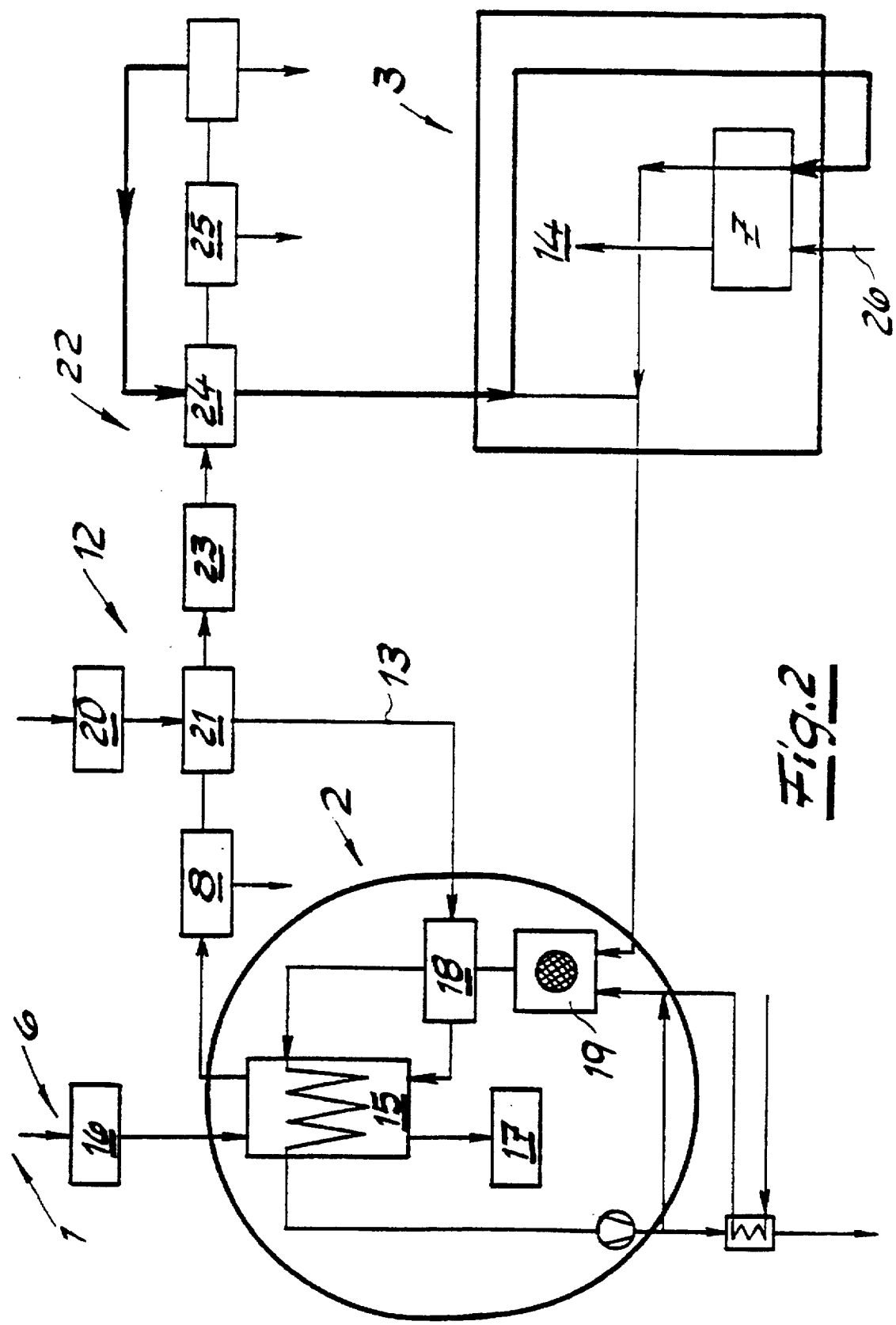
FIG. 2 is a block diagram of the function of the plant of FIG. 1 in relation to the gasification and fuel cell module.

FIG. 2 shows the gasification module 2 which can be set up for allothermal gasification. The gasification reactor 15 is principally designed for pressurized gasification using water vapor, the water vapor serving as gasification and fluidising agent. As mentioned above the fuel cell module 3 can contain various normally used fuel cells 7. Furthermore the example shows a water vapor module 12 connected via a line 13 being heated by partial of the fuel gas by combustion. The waste heat can be utilized as described.

Electrical energy can be tapped at position 14 of the Modular Power Plant, used locally or fed into a net.

FIG. 2 shows the gasification reactor 15 with a device 16 for the supply of gasification preproducts and an ash pit 17 as partial of the gasification model 2. Furthermore a heat exchanger 18 heats the water vapor. This heat exchanger 18 is heated by a gasification chamber 19 supplied with partial of the fuel gas. The water required for the water vapor is supplied by a water treatment unit 20 and supplied to a steam generator 21. It is understood that pumps and valves are required and devices for waste heat utilization provided.

The fuel cell module 3 operates with at least one of the described fuel cells 7, receiving the fuel gas, which has been cleaned and freed from sulphur remnants. The gasification module 2 and the fuel cell module 3 are connected via an installation 22, a reactor 23 being of importance for increasing the hydrogen content of the fuel gas by a water gas process. Furthermore, the unit comprises a heat exchanger 24 and a quencher 25.

The thus pretreated fuel gas enters the fuel cell 7 on the anode side which receives air via line 26 on the cathode side. In this respect FIG. 2 shows just one example.

I claim:

1. A modular power plant of the generation of electrical energy from solar energy, said power plant comprising:
   a conversion module for producing a biological raw material from solar energy and comprising:
      an agricultural plot cultivated with low-sulphur plants for production of said raw material,
      a harvesting unit displaceable over said plot for harvesting said plants,
      at least one further unit selected from a chopper and a pelletizer for harvested plants and receiving harvested plants from said harvesting unit for forming said raw material from the harvested plants,
      means for drying said raw material with at least one of a combustion of a fuel gas and waste heat from the power plant, and
      storage means receiving said raw material for compensating variations in harvested quantities of the raw material due to vegetation cycles;
   an allothermic gasification module connected to said conversion module for receiving said raw material from said conversion module and transforming the received raw material into a fuel gas, said allothermic gasification module comprising:
      a gasification reactor supplied with externally produced heat and receiving said raw material from said conversion module and water vapor and producing said fuel gas by an allothermic gasification at a temperature and for a residence time sufficient to suppress tar formation in said reactor and apparatus of said plant downstream from said reactor,
      a charging device connected said storage means with said reactor for supplying said raw material thereto, and
      a gas cleaner connected to said gasification reactor for cleaning said fuel gas; and
   a fuel cell module comprising at least one fuel cell and receiving said fuel gas from said gas cleaner and producing electrical energy therefrom, said allothermic gasification module and said fuel cell module being performance matched so that a portion of said fuel gas is available to produce said water vapor and another portion of said fuel gas is available for optional combustion to dry said raw material, the plot being dimensioned to supply the raw material for the output performance of said fuel cell module and whereby at least principal elements of said modules are prefabricated at a central location and transportable to a situs of the plant in assembled and disassembled state.

2. The modular power plant defined in claim 1 wherein said gasification module has an oxygen/raw material ratio and temperature for producing said fuel gas substantially free from nitrogen oxides.

3. The modular power plant defined in claim 1 wherein said fuel cell module has at least one fuel cell with a phosphoric acid electrolyte.

4. The modular power plant defined in claim 1 wherein said fuel cell module has at least one fuel cell with a carbonate melt electrolyte.

5. The modular power plant defined in claim 1 wherein said fuel cell module has at least one proton exchange membrane fuel cell.

6. The modular power plant defined in claim 1, further comprising a water vapor producing module heated by a portion of said fuel gas.

* * * * *